W. A. WOOD.
HARVESTER-RAKE.
No. 187,575.  Patented Feb. 20, 1877.
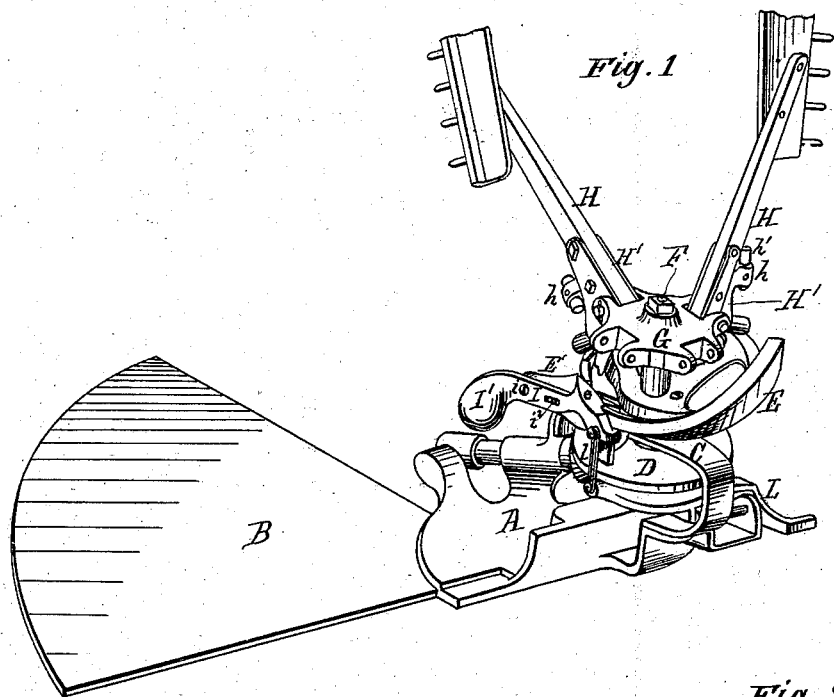
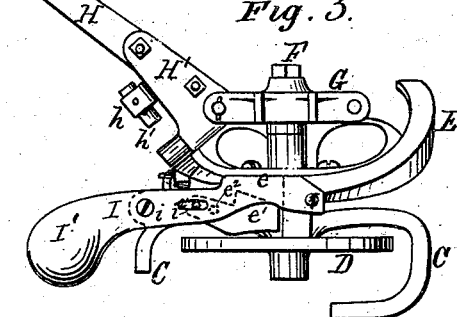
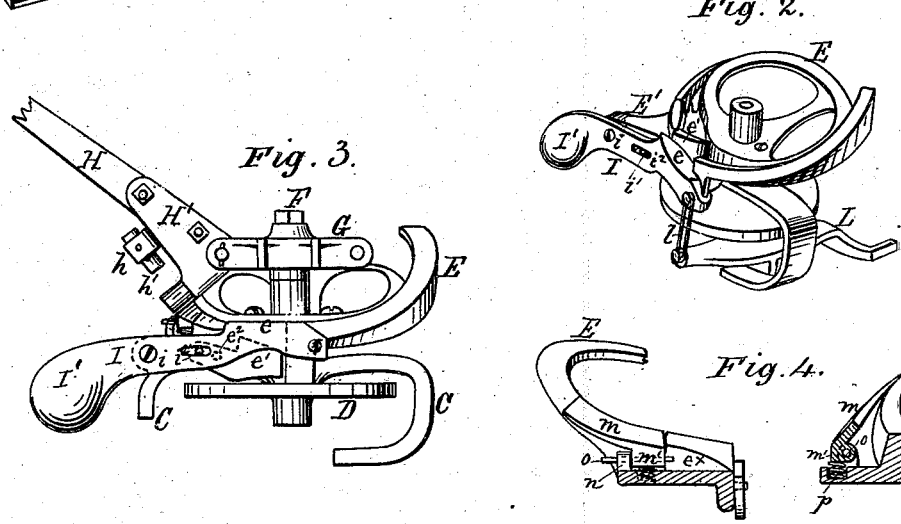
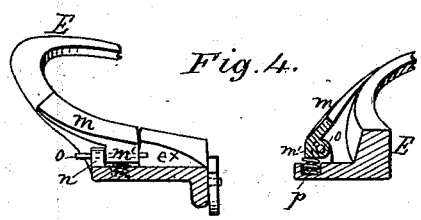
Witnesses:
Alexander Mahon
John G. Center
Inventor:
Wm. Anson Wood
by A. M. Smith, atty.

ature.

UNITED STATES PATENT OFFICE.

WILLIAM A. WOOD, OF ALBANY, NEW YORK.

IMPROVEMENT IN HARVESTER-RAKES.

Specification forming part of Letters Patent No. 187,575, dated February 20, 1877; application filed October 21, 1876.

*To all whom it may concern:*

Be it known that I, WILLIAM ANSON WOOD, of the city and county of Albany, State of New York, have invented certain new and useful Improvements in Harvester-Rakes, of which the following is a full, clear, and exact description, reference being had to the accompanying drawings, making part of this specification, in which—

Figure 1 represents a perspective view of my improved rake attachment to harvesters, or as much thereof as is necessary to show my invention. Fig. 2 is a similar view of the rake-stand, cam, and of the latch or gate which determines the path of the rake and reel arms. Fig. 3 is a side elevation of the same with one of the rake and reel arms applied; and Fig. 4 represents sectional views through the cam-track, showing the construction and arrangement of the return-switch.

Similar letters of reference denote corresponding parts wherever used.

My invention relates to the means for controlling the path of the arms of a combined rake and reel, adapting said arms to act as reel-beaters or gathering-arms only, or as gathering and discharging rake-arms, as may be required; and consists in a novel arrangement, in connection with the usual cam-track for imparting the necessary rising and falling movements to the rake and reel arms, of a pivoted switch or gate, located outside of and vibrating within the path of the rake-rollers, for changing the path of said rollers and causing the arms to act as reel-arms, as hereinafter explained.

It further consists in combining a vibrating portion of the cam-track, attached to a weighted lever, with the vertically-vibrating switch or gate last described, for holding said switch withdrawn from the path of the rake-rollers, except when it is moved into said path by the attendant, or automatically by devices connected with the rake-arms and operating on the weighted lever, as hereinafter described.

It further consists in providing the rake and reel arms with adjustable pins, which, by their adjustment toward or away from the rake-roller, may be made to act automatically upon the weighted lever and switch for closing the latter, or to pass by without acting thereon, according as it is desired to have the arms act as reel or rake arms, as hereinafter described.

It further consists in mounting the return-switch, or that part of the outer reel-track over which the reel-arm roller returns to the main or fixed portion of the track, upon a horizontal longitudinal pivot, and combining with it a spring for holding it in proper position to return the reel-arm roller, except when yielding to permit the passage of a rake-arm roller, as hereinafter described.

In the accompanying drawing, A represents what may be either a portion of the main frame, or the shoe at the inner end of the cutting apparatus and grain-platform B, according to the organization of the machine. C is the rake-standard, made, by preference, in the yoke form shown, whereby it is provided with supporting-legs, one in front and the other in rear of the line of the cutting apparatus, and of the crown or rake-driving gear D, as shown. E is the rake cam or track, mounted on the standard C; F, the vertical rake-shaft; G, the revolving rake-head, and H the rake and reel arms, all of the above parts, except in particulars hereinafter specified, being made in any usual or preferred form. The cam-track E is cut away on its side adjacent to the platform, and the outer ledge of the portion of track thus cut away is replaced by a pivoted portion of track $e$, formed upon the forward arm of a vertically-vibrating weighted lever, I, pivoted at $i$ to an arm, E', on the cam-plate E, the weight at I', on the rear end of said lever, serving to hold the track portion $e$ up in proper relation to the track E, to replace the portion of the outer ledge cut away, as described.

Inside of the pivoted portion $e$, and crossing the plane of the grooved portion of the track E, is a vibrating gate, $e^1$, the forward end of which crosses the path of the rake-roller obliquely, and forms the switch for changing the path of said roller, said gate being connected by a horizontal pivot with the cam-plate at $e^2$. The rear arm of this gate $e^1$ is connected with the weighted lever I by a pin at $i^1$, which enters a slot at $i^2$ in said lever, the arrangement being such that when the track portion e is raised by the weighted lever, the rear arm of the gate will be elevated by the lever depressing the switch end of said gate, and withdrawing it below the cam-groove and out of the path of the rake-roller, while on the contrary, when the weighted arm of the lever I is raised, depressing the track portion e, and removing it out of the way of the rake-roller, the switch is elevated within the path of the rake-roller, and crossing said path obliquely, as described, causes the roller to be moved outward over the track e, thereby lifting the rakes out of the grain on the platform, and causing them to act as reel-arms.

By this arrangement it will be seen that while all of the arms may be adapted or set to act as rake-arms, by simply depressing the forward arm or track portion e of the lever I, all or any number of said arms may be made to act simply as reel-arms. This depression of the forward arm of lever I may be effected by the attendant at will by means of a link, $l$, connecting it with a lever, L, extended either directly or through the medium of suitable connecting devices into convenient position to be acted upon by the foot or hand of the driver in his seat on the machine, and it may also be effected automatically by devices connected with the rake-arms themselves, as follows: The metallic elbow and socket-plate H′, through which the rake-arms are pivoted to the revolving head G, are provided, a short distance outside of the roller-arm, with a pendent arm, $h$, perforated horizontally or on a line parallel, or nearly so, with the rake-arm, to receive a pin, $h'$, as shown. This pin is provided with two or more perforations, in one of which a pin passing through the arm $h$ engages, for holding the pin $h'$ in the required position. The pendent bracket $h$, in the passage of the rake-arm over the track portion $e$ of the weighted lever I, is on the outer or platform side of said track $e$; but by adjusting the pin $h'$ inward toward the rake-roller, said pin is made to rest upon said track portion, and by the weight of the rake-arm to depress it, thereby raising the switch $e^1$, as explained, for causing the rake-roller to pursue the outer path necessary to cause its arm to act as a reel-arm.

By moving the pin outward, it passes the track $e$ without coming in contact therewith, leaving said track elevated and the switch $e^1$ depressed and out of the path of the rake-roller.

The pin $h'$ may be provided with a friction-roller for facilitating its passage over the track, and the pin may be held at the required adjustment by means of a set-screw or other equivalent device, in lieu of the pin and perforations described.

The return-switch $m$ (see Fig. 4) has on its forward end a pendent lug or ear, $m'$, fitting between a portion, $e^\times$, of the outer ledge of the cam, and a lug or ear, $n$, on the cam-plate, and a pin, $o$, passing horizontally through the lugs $m$ $m'$ and into the rear end of ledge $e^\times$, serves to pivot the switch $m$ to the cam-plate. Underneath the lug or ear $m'$ is placed a small spring, $p$, the tension of which serves to hold the rear end of the switch in contact with the permanent portion of the cam-track, in proper position to return the rake-arm roller thereto after it has been caused to pursue the outer path of a reel-arm roller by the switch $e^1$, but yielding to permit the passage of the roller on the inside of the switch $m$ when the arms act as rake-arms.

By this arrangement a rocking movement is given to the switch $m$, and its resistance to the passage of the reel-arm rollers is materially diminished.

Parts of the machine not particularly described may be constructed and arranged in any usual or preferred manner.

Having now described my invention, what I claim as new, and desire to secure by Letters Patent, is—

1. The combination, with the cam or rake track E, of a vibrating switch or gate, $e^1$, adapted to be projected into and to form a part of, or to be withdrawn from, the cam-track, substantially as and for the purpose set forth.

2. The vibrating switch $e^1$, in combination with the vibrating portion $e$ of the cam-track E, attached to the weighted lever I, arranged and operating substantially as described.

3. The combination, with the switch or gate $e^1$ and lever I, with its track portion $e$, arranged and operating as described, of the link $l$ and lever L, or equivalent devices, for placing said lever and switch under control of the driver, as explained.

4. The rake-arms H, provided with the pendent brackets $h$ and adjustable pins $h'$, in combination with the lever I and pivoted track portion $e$, for operating said switch $e^1$, as described.

5. The return-switch $m$, adapted to rock or roll on a horizontal longitudinal pivot, as described, in combination with the spring $p$, arranged and operating as described.

WM. ANSON WOOD.

Witnesses:
GEO. M. METCALF,
JOS. S. WATSON.